(12) United States Patent
Guillama et al.

(10) Patent No.: US 10,162,477 B2
(45) Date of Patent: Dec. 25, 2018

(54) SYSTEM AND METHOD FOR PERSONALIZED FAST NAVIGATION

(71) Applicants: The Quantum Group, Inc., Lake Worth, FL (US); Noel J. Guillama, Wellington, FL (US)

(72) Inventors: Noel J. Guillama, Wellington, FL (US); Chester Heath, Boca Raton, FL (US); Jahziel Guillama, Wellington, FL (US); Pedro Alejandro Sanchez, Wellington, FL (US)

(73) Assignees: THE QUANTUM GROUP, INC., Lake Worth, FL (US); Noel J. Guillama, Wellington, FL (US)

( * ) Notice: Subject to any disclaimer, the term of this patent is extended or adjusted under 35 U.S.C. 154(b) by 296 days.

(21) Appl. No.: 14/313,282

(22) Filed: Jun. 24, 2014

(65) Prior Publication Data

US 2014/0310615 A1    Oct. 16, 2014

Related U.S. Application Data

(63) Continuation-in-part of application No. 12/506,659, filed on Jul. 21, 2009, now Pat. No. 8,762,884.

(60) Provisional application No. 61/083,017, filed on Jul. 23, 2008.

(51) Int. Cl.
*G06F 3/0481* (2013.01)
*G06F 3/0482* (2013.01)

(52) U.S. Cl.
CPC ........ *G06F 3/04817* (2013.01); *G06F 3/0482* (2013.01)

(58) Field of Classification Search
CPC ............... G06F 3/0482; G06F 3/04842; G06F 3/04817; G06F 3/0484
See application file for complete search history.

(56) References Cited

U.S. PATENT DOCUMENTS

| | | | |
|---|---|---|---|
| 5,220,657 A | 6/1993 | Bly et al. | |
| 5,564,004 A | 10/1996 | Grossman et al. | |
| 5,694,563 A | 12/1997 | Belfiore et al. | |
| 5,712,654 A * | 1/1998 | Kawashima | G06F 9/4443 700/83 |
| 6,002,403 A | 12/1999 | Sugiyama et al. | |
| 6,262,726 B1 | 7/2001 | Stedman | |
| 6,377,286 B1 | 4/2002 | Hochmuth | |
| 6,426,761 B1 | 7/2002 | Kavensky et al. | |

(Continued)

*Primary Examiner* — Steven Sax
(74) *Attorney, Agent, or Firm* — Nixon Peabody LLP; Eduardo J. Quiñones

(57) ABSTRACT

A system for personalized navigation of computer screens. The system can comprise electronic data processors. The system can also include a module configured to execute on the electronic data processors, where the module can be configured to display a plurality of icons retained in a file associated with a particular user on a computer screen. The icons can comprise one or more assigned icons from an assigned icons list and candidate icons from a candidate icons list, where both the assigned and candidate icons are derived from a pool of icons. Also, the module can be configured to assign an icon to a currently displayed screen by utilizing a selection tool and placing the icon in the assigned icons list, where the icon is selected from the candidate icons list. The module can be further configured to return to the assigned screen when the assigned icon is selected.

20 Claims, 8 Drawing Sheets

Assigned Icons

403a

402b

Candidate Icons

404a

Mouse Cursor
406

404b

400

(56) References Cited

U.S. PATENT DOCUMENTS

| | | | |
|---|---|---|---|
| 6,684,264 B1* | 1/2004 | Choi | B29C 45/76 700/201 |
| 6,806,892 B1 | 10/2004 | Plow et al. | |
| 7,107,268 B1* | 9/2006 | Zawadzki | G06Q 10/06 |
| 7,620,894 B1 | 11/2009 | Kahn | |
| 7,653,897 B2* | 1/2010 | Ruff | G06F 9/4403 713/1 |
| 9,916,060 B2* | 3/2018 | Hosein | G06F 3/04817 |
| 2002/0004744 A1 | 1/2002 | Muyres et al. | |
| 2002/0122066 A1 | 9/2002 | Bates et al. | |
| 2002/0136563 A1* | 9/2002 | Maeda | H04N 1/00352 399/81 |
| 2003/0018714 A1* | 1/2003 | Mikhailov | G06F 17/30861 709/203 |
| 2003/0117440 A1 | 6/2003 | Hellyar et al. | |
| 2003/0225730 A1 | 12/2003 | Warner et al. | |
| 2004/0135812 A1* | 7/2004 | Tai | G06F 9/4443 715/779 |
| 2004/0186746 A1* | 9/2004 | Angst | G06F 19/322 705/3 |
| 2004/0216058 A1 | 10/2004 | Chavers et al. | |
| 2005/0075544 A1* | 4/2005 | Shapiro | G06F 19/322 600/300 |
| 2005/0097506 A1* | 5/2005 | Heumesser | G07C 1/10 717/102 |
| 2005/0188331 A1* | 8/2005 | Shimada | G06F 3/04817 715/816 |
| 2005/0257161 A1* | 11/2005 | Martin | G06F 17/30905 715/760 |
| 2006/0123353 A1 | 6/2006 | Matthews et al. | |
| 2006/0168101 A1 | 7/2006 | Mikhailov et al. | |
| 2007/0204037 A1 | 8/2007 | Kunz et al. | |
| 2007/0243935 A1* | 10/2007 | Huizinga | G07F 17/32 463/42 |
| 2007/0245407 A1 | 10/2007 | Lester et al. | |
| 2007/0253259 A1* | 11/2007 | Nakatani | G06F 12/0866 365/185.33 |
| 2007/0288860 A1 | 12/2007 | Ording et al. | |
| 2008/0040684 A1* | 2/2008 | Crump | G06F 3/0482 715/808 |
| 2008/0082262 A1 | 4/2008 | Da Silva et al. | |
| 2008/0122796 A1* | 5/2008 | Jobs | G06F 3/0488 345/173 |
| 2008/0168367 A1 | 7/2008 | Chaudhri et al. | |
| 2009/0199122 A1 | 8/2009 | Deutsch et al. | |
| 2009/0199133 A1 | 8/2009 | Deutsch et al. | |
| 2010/0231790 A1* | 9/2010 | Ansari | G06Q 30/04 348/552 |
| 2013/0100474 A1* | 4/2013 | Ono | H04N 1/00474 358/1.13 |

\* cited by examiner

500

700

SYSTEM AND METHOD FOR PERSONALIZED FAST NAVIGATION

CROSS-REFERENCE TO RELATED APPLICATIONS

This application is a continuation-in-part of U.S. Non-Provisional patent application Ser. No. 12/506,659, which was filed Jul. 21, 2009 and which claims the benefit of U.S. Provisional Patent Application No. 61/083,017, which was filed Jul. 23, 2008. Both of these applications are incorporated herein in their entirety.

FIELD OF THE INVENTION

The present invention is related to the fields of computer system navigation, and more particularly, to personalized navigation techniques to increase worker productivity.

BACKGROUND OF THE INVENTION

Technology has played a pivotal role in simplifying many tasks, solving problems, decreasing operating costs, and shaping how work is done today. Despite the many problems that have already been solved through the use of technology, optimizing worker productivity still remains a goal that continues to need significant focus and attention. Workers in medical and other data entry types of situations often develop a pattern of work where a limited set of preferred screens are typically selected from a group of many screens on their computing devices. Navigating through the various screens involves going through multiple and, often times, confusing steps to arrive at the desired screen, or sets of screens.

Having to go through multiple, often tedious, and sometimes confusing steps lends itself to frustrated employees, decreased worker productivity, wasted time, and increased costs. In order to more effectively increase worker productivity, one must do so by reducing the amount of steps, menus, time, and other hurdles the worker has to go through to get to a desired screen. When a worker can access screens with relative ease and fewer steps, the worker can devote the saved time to other important tasks. As a result, there is a need for a more effective, efficient, and intuitive means of navigation so as to increase worker productivity.

SUMMARY OF THE INVENTION

The present invention is directed to systems and methods for personalized navigation of computer screens within a computer system. The invention simplifies navigation by reducing the number of steps required to access a particular screen, thereby increasing worker productivity.

One embodiment of the invention is a system for personalized navigation of computer screens. The system can comprise one or more electronic data processors. The system can also include a module configured to execute on the more or more electronic data processors, where the module can be configured to display a plurality of icons retained in a file associated with a particular user on a computer screen. The icons can comprise one or more assigned icons from an assigned icons list and candidate icons from a candidate icons list, where both the assigned and candidate icons are derived from a pool of icons. Also, the module can be configured to assign an icon to a currently displayed screen by utilizing a selection tool and placing the icon in the assigned icons list, where the icon is selected from the candidate icons list. The module can be further configured to return to the assigned screen when the assigned icon is selected.

Another embodiment of the invention is a computer-based method for personalized navigation of computer screens within a computer system. The method can include displaying a plurality of icons retained in a file associated with a particular user on a computer screen, wherein the icons comprise one or more assigned icons from an assigned icons list and candidate icons from a candidate icons list, which, in turn, are derived from a pool of icons. The method can also include assigning an icon to a currently displayed screen utilizing a selection tool and placing the icon in the assigned icons list, where the icon is selected from the candidate icons list. Furthermore, the method can include returning to the assigned screen when the assigned icon is selected.

Yet another embodiment of the invention is a computer-readable storage medium that contains computer-readable code that when loaded on a computer causes the computer to perform the following steps: displaying a plurality of icons retained in a file associated with a particular user on a computer screen, where the icons comprise one or more assigned icons from an assigned icons list and candidate icons from a candidate icons list, which are derived from a pool of icons; assigning an icon to a currently displayed screen utilizing a selection tool and placing the icon in the assigned icons list, where the icon is selected from the candidate icons list; and returning to the assigned screen when the assigned icon is selected.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
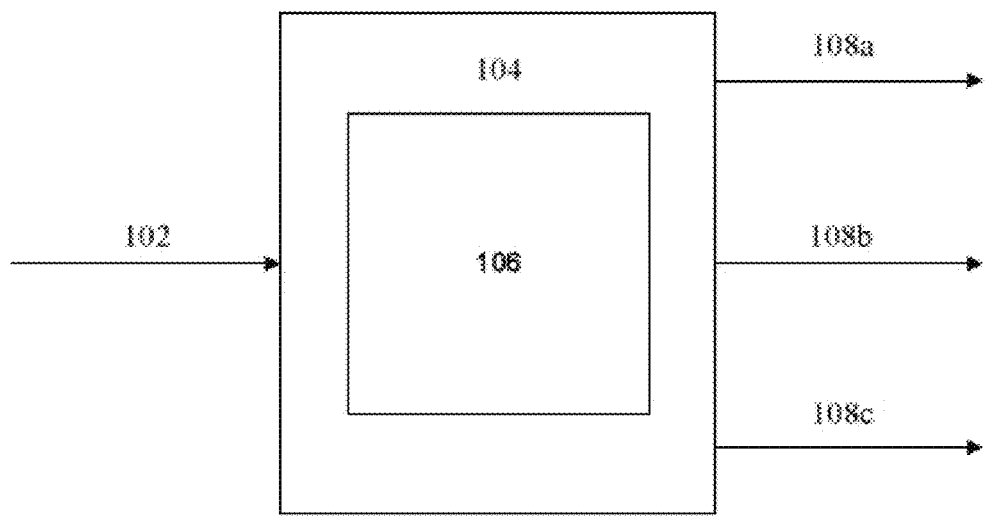
FIG. 1 is a schematic view of a system for personalized navigation of computer screens, according to one embodiment of the invention.

Referring initially to FIG. 1, a system 100 for personalized navigation of computer screens, according to one embodiment of the invention, is schematically illustrated. The system can include one or more inputs 102 and one or more outputs 108*a-c*. The one or more inputs 102 can be generated from a computer mouse, touch screen device, or other input device. The one or more outputs 108*a-c* can include displaying icons, assigning icons, or returning a user to a particular screen. The system 100 also can include one or more electronic data processors 104. Although one input 102 and three outputs 108a-c are shown, it will be apparent to one of ordinary skill based on the description that a greater number of inputs and a greater or lesser number of outputs can be utilized. The system 100 also can include a module 106, which, can be implemented as computer-readable code configured to execute on the one or more electronic data processors 104.

Alternatively, the module 106 can be implemented in hardwired, dedicated circuitry for performing the operative functions described herein. In yet another embodiment, however, the module 106 can be implemented in a combination of hardwired circuitry and computer-readable code.

Operatively, the module 106 displays a plurality of icons retained in a file associated with a particular user on a computer screen, where the icons comprise one or more assigned icons from an assigned icons list and candidate icons from a candidate icons list. Both the assigned and candidate icons are derived from a pool of icons. In some embodiments, the icons can be random or generic, i.e., have no specific meaning to user. However, in other embodiments, some meaning can be attached to some or all of the icons. For example, icons for the pool of icons can be selected or configured such they are meaningful only to the user or a group of particular users. Alternatively, icons in the pool of icons can have a meaning generally understood by all users. Further, in some embodiments, the meaning for the icons can be enduring or ephemeral, i.e., with meaning only lasting for the duration of a finite number of decision processes.

In some configurations, at least one icon in the pool of icons can have some type of functionality associated therewith. For example, icons can be configured to alter in appearance to provide notifications, alerts, or warnings under certain circumstances, each of which can have specific meaning for a finite number of users or general meaning to all users. For example, in some configurations, an icon can blink, change color, or be otherwise altered in appearance if another user makes a change on a computer screen or if an entry requiring attention is generated on a computer screen. In some cases, the icons can be configured to only be altered for certain users or the alteration can be such that it only has meaning to certain users.

In the various embodiments, the configuration of icons can vary. In some cases, the pool of icons can be purely graphical or picture-types elements that can be selected from the pool. In other configurations, the icons can each be one or more alphanumeric characters that can be selected from the pool. In some configurations, the icons can be customized. That is, a blank icon can be provided and the user can be permitted to define the visual content for the icon.

Although the various embodiments will be described primarily with respect to a single user and sets of icons specifically associated with the user, the various embodiments are not limited in this regard. In other embodiments, the pool of icons and and any displayed icons can be present to any number of users. Thus, icons assigned during one session using one user can appear in other sessions associated with the same or different users. However, a user can also specify types of icons to utilize for the user. Thus, during such a session, the user-specific icons replace the pre-selected icons. In some configurations, the number and types of icons presented during different sessions can be restricted based on the user associated with the session. For example, certain types of information or notifications may be irrelevant to some types of users.

Figure 2:
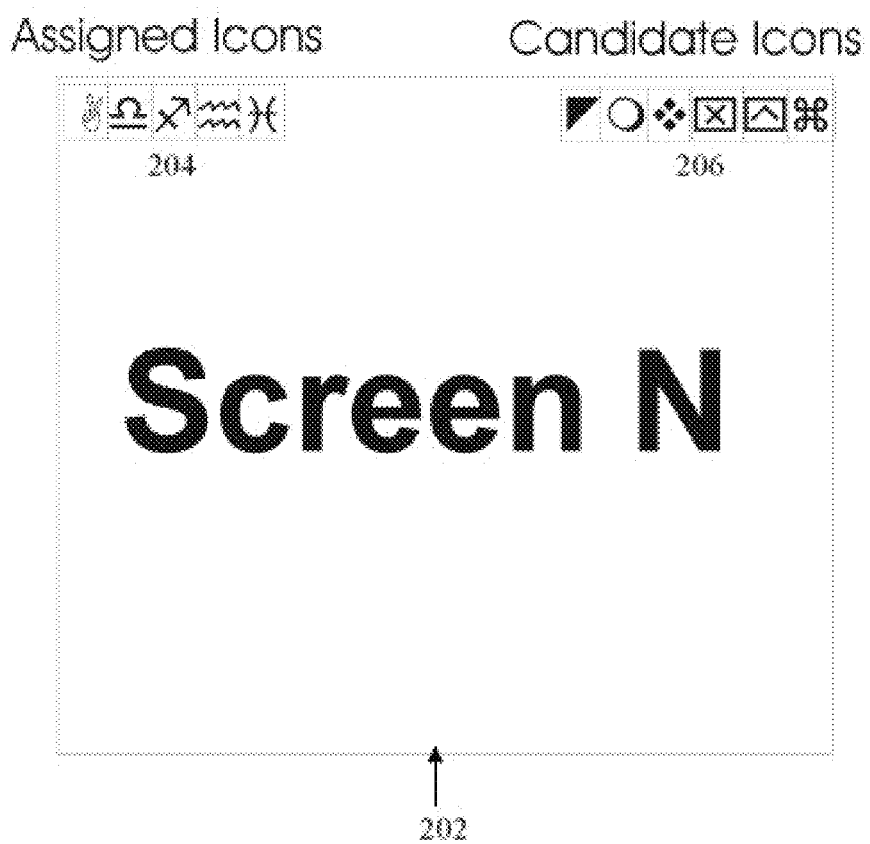
FIG. 2 is a view of a computer display and screen including assigned icons and candidate icons.
Figure 3:
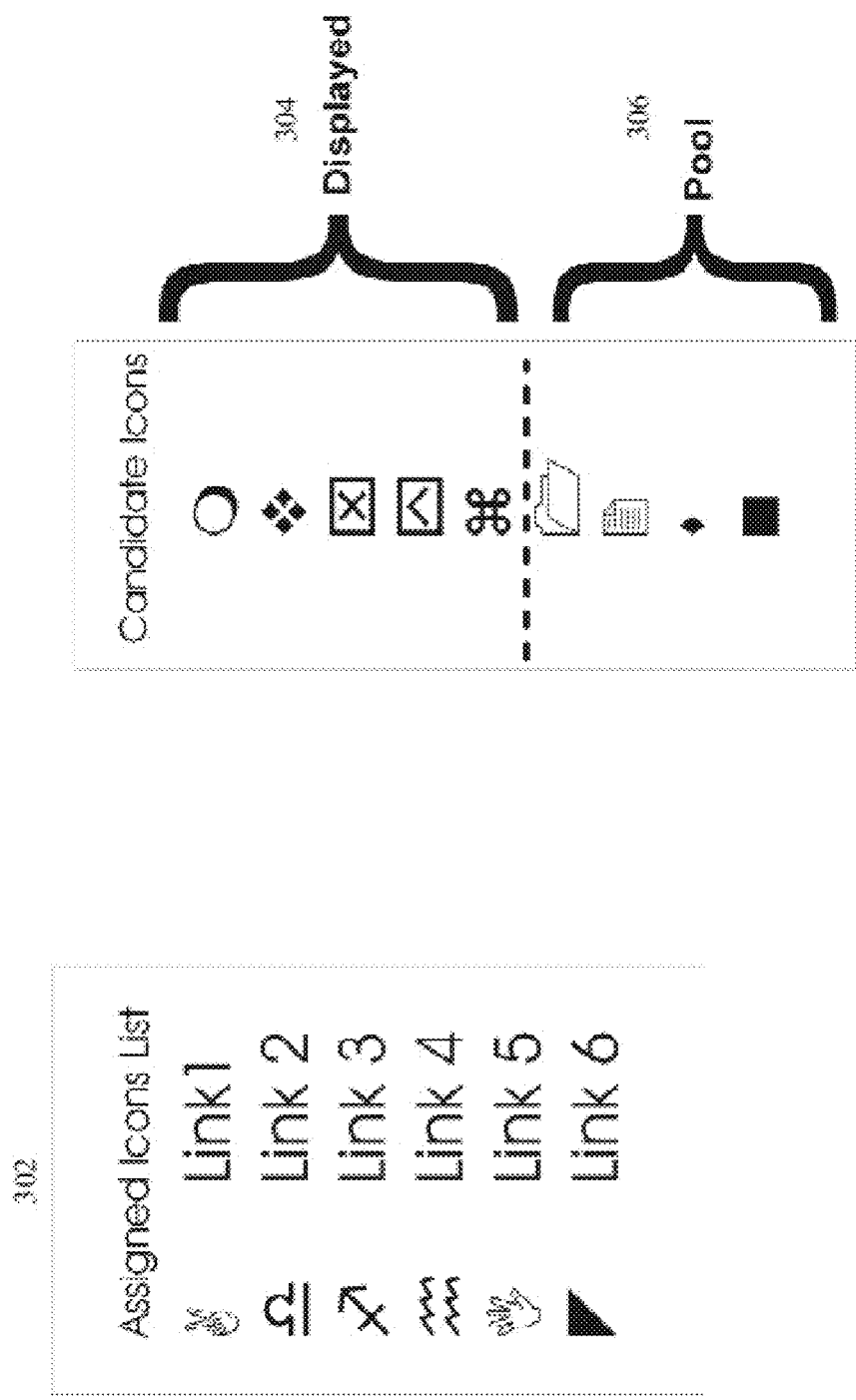
FIG. 3 is a view of a screen featuring assigned icon and candidate icon lists.

Referring now also to FIG. 2, an example of a computer display 200 powered by the module 106 is illustrated. The computer display 200 can display a particular screen N 202, while also displaying assigned icons 204 and candidate icons 206. The particular screen N 202 can be associated with one of the assigned icons 204. Referring additionally to FIG. 3, a screen 300 featuring an assigned icon list 302 and a candidate icon list 304 is provided. Assigned screens and links have corresponding assigned icons with the assigned icon list 302. The screen 300 can display both the assigned icon list 302 and the candidate icon list 304, which are derived from a pool of icons 306. The pool of icons 306 are not displayed.

Figure 4:
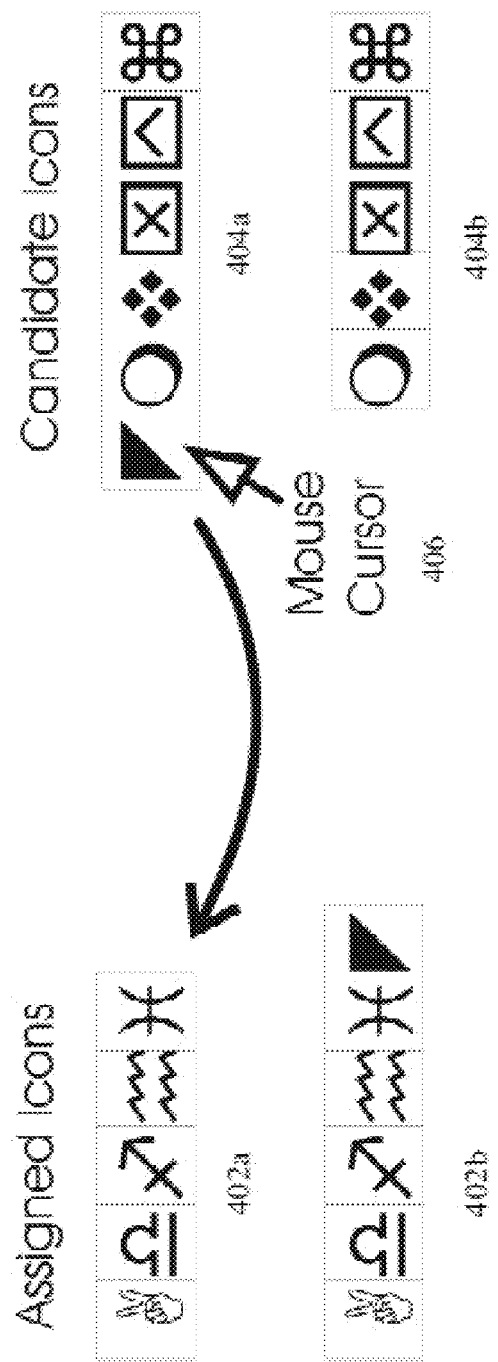
FIG. 4 is an illustration depicting the assignment of icons to the assigned icons list from the candidate icons list.

Additionally, the module 106 assigns an icon to a currently displayed screen utilizing a selection tool and placing the icon in the assigned icons list, where the icon is selected from the candidate icons list. The selection tool can comprise a computer mouse, a touch screen device, keyboard or other input device. Referring now also to FIG. 4, an illustration of a screen 400 depicting the assignment of icons to an assigned icons list from a candidate icons list is provided. The screen 400 includes assigned icons 402a, candidate icons 404a, and a selection tool 406, which in this case is a mouse cursor. A user utilizing the selection tool 406, assigns one of the candidate icons 404a to a currently displayed screen. This operation causes the chosen candidate icon 404a to be become one of the assigned icons 402b and the candidate icons 404b are updated to reflect the change.

Figure 5:
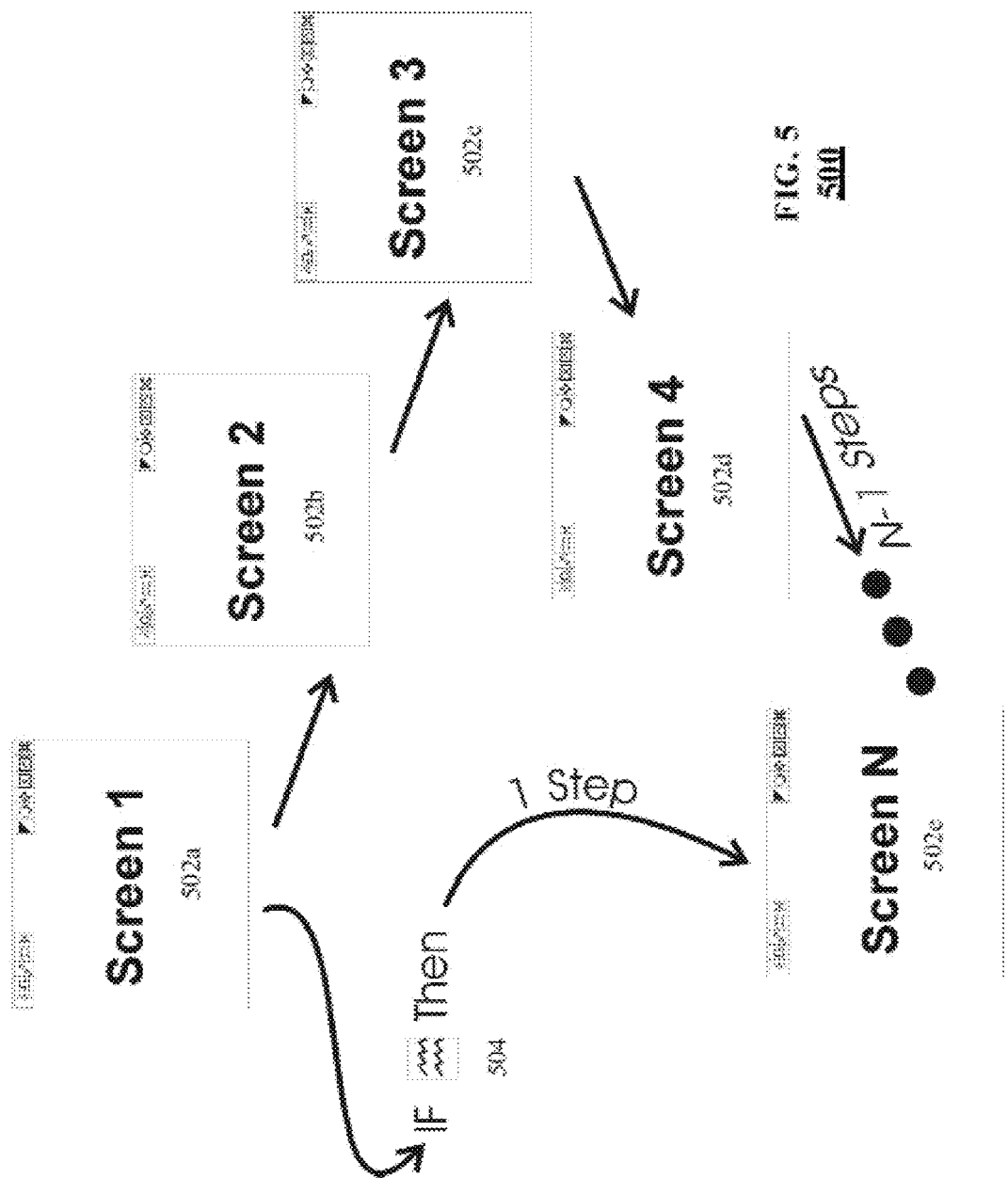
FIG. 5 is a flowchart that illustrates a reduction of steps needed to view a particular screen using the system as compared to a traditional process, according to an embodiment of the invention.

Furthermore, the module 106 returns to the assigned screen when the assigned icon is selected. Referring now also to FIG. 5, a flowchart is provided that illustrates a reduction in steps needed to view a particular screen using a system 500 as compared to a traditional process. The system 500 includes sequential screens 502a-e and an assigned icon 504, which is assigned to screen 502e. A user utilizing a traditional process to arrive at a particular screen will most likely have to go through N-1 steps to arrive at the desired screen. In the flowchart provided, the user would have to go through 5-1 or 4 steps to get to screen 502e, the fifth screen using a traditional process. However, if the user assigns the fifth screen 502e to a particular icon 504 and the user selects the icon 504, then the user can directly jump to screen 502e in a single step instead of in four steps.

According to a particular embodiment, the module 106 can be configured to assign an icon to a log on or sign on process for a particular user of the system. For example, an administrator of a computer system could assign a particular icon to a given user for logging on to the system. When a user clicks on the assigned icon the user is logged on to the system in a single step.

Figure 6:
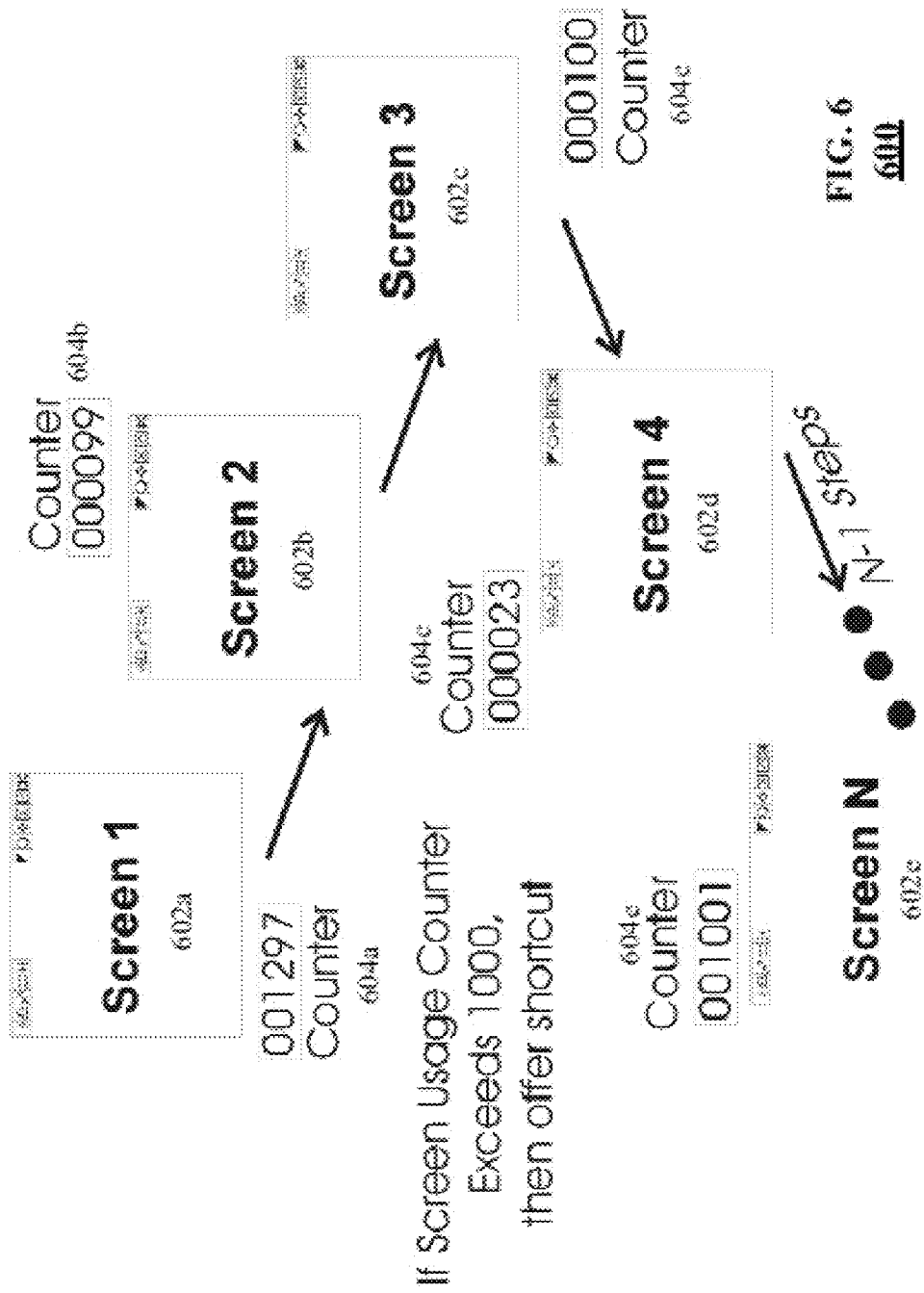
FIG. 6 is an illustration depicting use of counters by the system, according to an embodiment of the invention.

In another embodiment, the module 106 can be configured to identify frequently visited screens using counters, wherein each screen has a counter, which is incremented each time a user visits the particular screen. The counter for each screen can be reset by the user. The module 106 can be further configured to notify a user when a counter for a particular screen reaches a user-defined threshold. Referring now also to FIG. 6, an illustration depicting the use of counters by a system 600 is provided. The system 600 can include screens 602a-e and corresponding counters 604a-e. Each time a user visits screen 602a, for example, the corresponding counter 604a is incremented by one. Also, the system 600 can notify the user when a counter for a particular screen 602a-e reaches a user-defined threshold, which in this case happens to be 1000. The system 600 can cause a list of candidate icons to blink, change color, or otherwise emphasize itself to the user, so that the user may assign one of the candidate icons to the screen passing the threshold. The thresholds for the counters can be changed to decrease or increase the number of preferred screens 602a-e that the system 600 may suggest to the user.

According to one embodiment, the module 106 can be configured to modify the functions of a particular icon when the icon is selected, wherein the functions are selected from at least one among returning a displayed icon to the pool of icons, replacing the displayed icon with a new icon, elevating or reducing the functionality of an icon, and including the icon in a defined sequence of functions. For example, if a user does not like a particular icon in the currently displayed candidate list the user can return the icon to the pool of icons and have a new icon take the place of the previous icon in the candidate list. The user can have the option of deleting the icon, undoing the last icon, showing the candidate icon library, elevating the status of the icon, associating the icon with a previous icon, assigning the icon as a next icon in a sequence of icons, changing the color of the icon, assigning the icon to a user sign-on process, entering text for highlighting, and creating reminder icons for notifying the user of important events.

Figure 7:
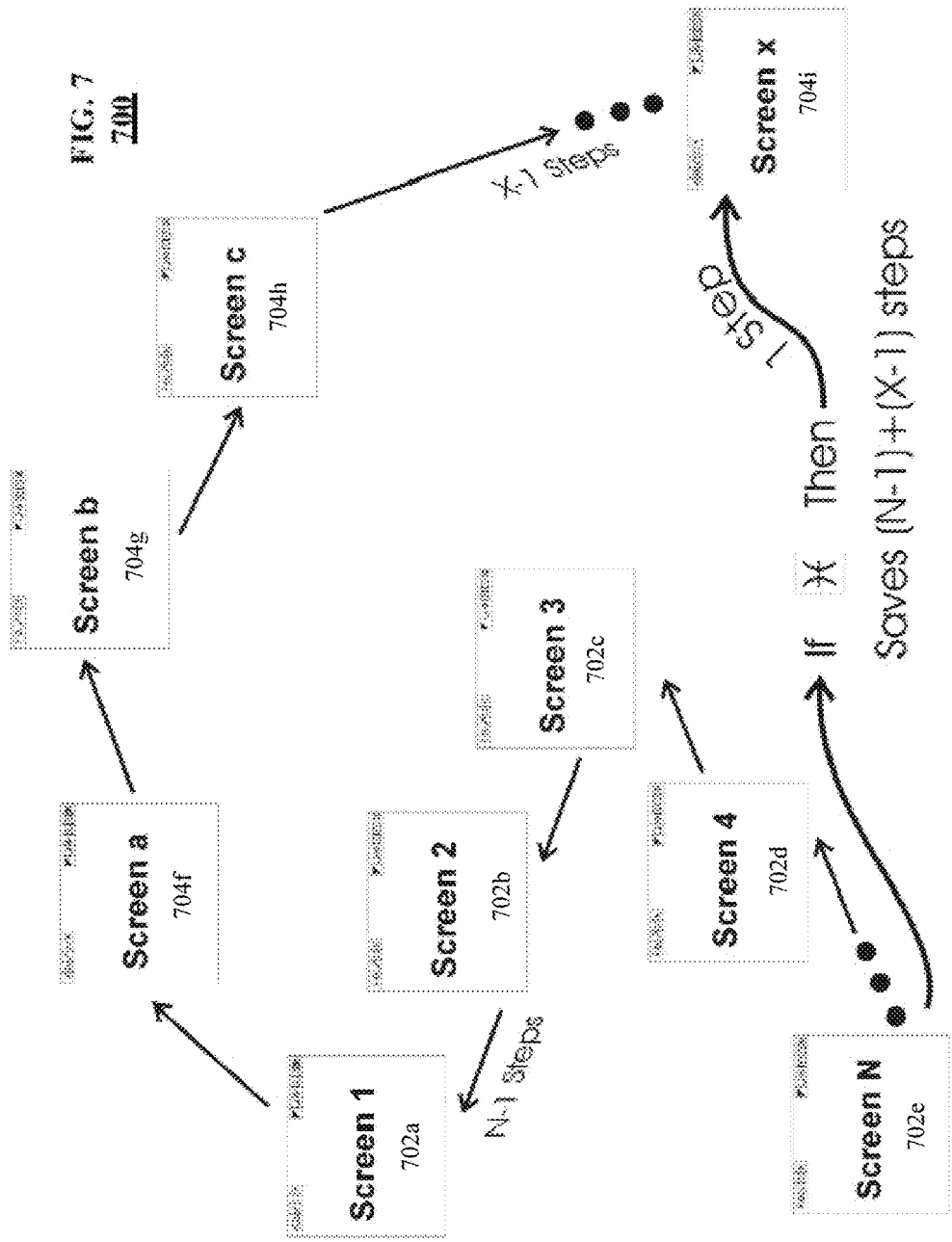
FIG. 7 is an illustration of moving directly from one screen to another in the system.

The module 106 can be further configured to move directly from one screen to an assigned screen when the corresponding assigned icon is selected. Referring now also to FIG. 7, an illustration of a system 700 enabling a user to move directly from one screen to another is provided. The system 700 can include screens 702a-e, which represent screens 1 through N, and screens 704f-i, which represent screens a through x. The system 700 also can include an icon 704, which can be assigned to screen 702i. If a user wants to move from screen N 702e to screenx702i, the user typically would have to traverse back to screen 1 702a, which takes N-1 steps. Then, the user could possibly have to go through x-1 steps to reach screenx702i. This leaves the user having to go through (N-1)+(x-1) steps plus a decision step. However, if the icon 704 is assigned to screenx702i, the user can move directly from screen N 702e to screenx 702i by selecting the icon 704.

In another embodiment, the module 106 can be configured to utilize a super icon, wherein the super icon is used to select a new set of preferred icons to be displayed in the assigned icons list. The module 106 can be further configured to utilize a next icon, wherein the next icon is selected by a user to step through sequential screens. For example, if a physician is using a computing device while examining a patient, the physician can select the patient's history and previous lab tests from a list of standard icons on his computing device. However, if the physician wanted to be able to view a new set of icons he could simply click a super icon, which would select a new sequence of preferred icons to be displayed in the list of assigned icons. The physician would step through the sequential screens by selecting the next icon. No more than one selection would be required to move from one step in the process to another. The patient could then go to checkout, where a clerk could select meaningful icons and utilize a super icon to see another set of preferred icons related to processes the clerk typically uses.

Figure 8:
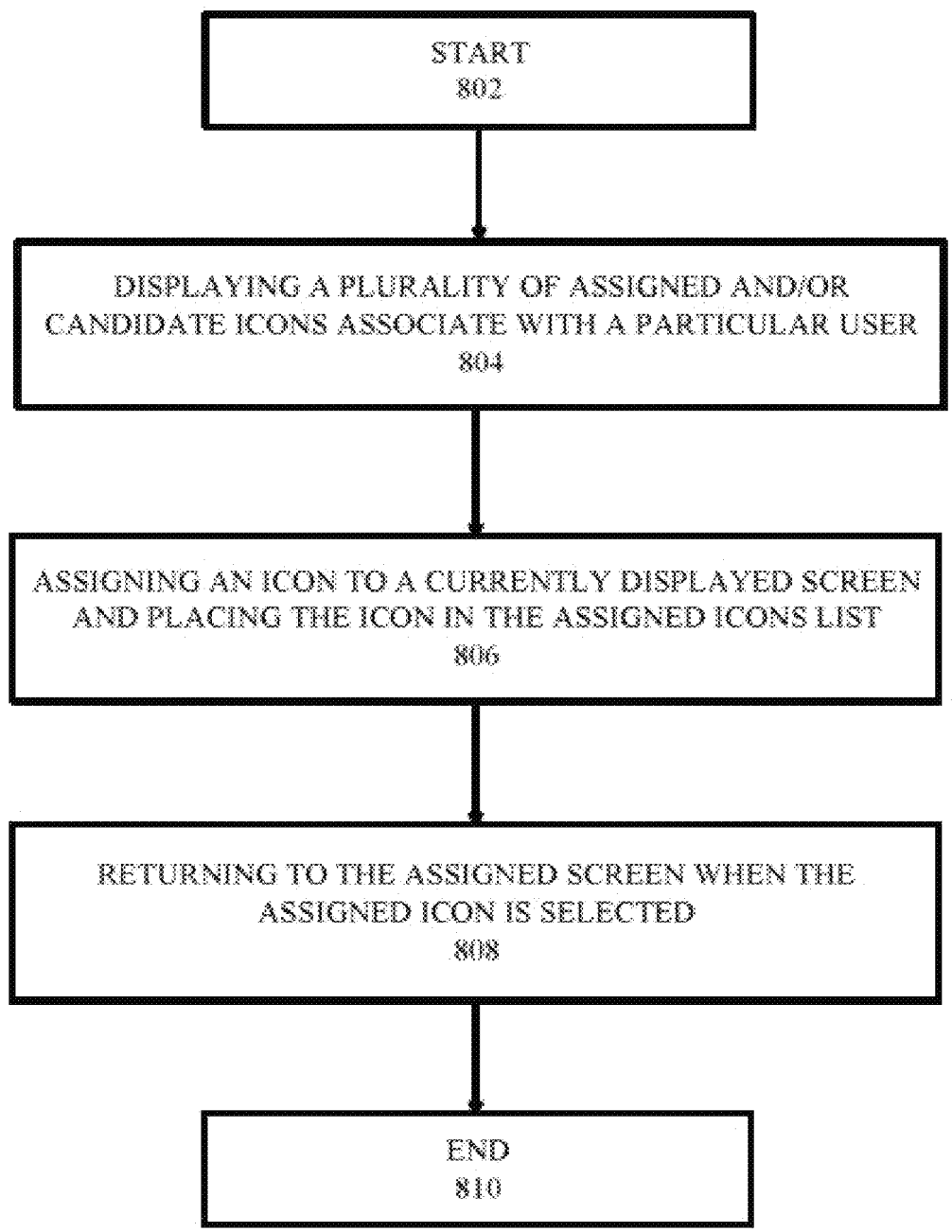
FIG. 8 is a flowchart of steps in a method for personalized navigation of computer screens within a computer system, according to another embodiment of the invention.

Referring now to FIG. 8, a flowchart is provided that illustrates certain method aspects of the invention. The flowchart depicts steps of a method 800 for personalized navigation of computer screens within a computer system. The method 800 illustratively can include, after the start step 802, displaying a plurality of icons retained in a file associated with a particular user on a computer screen, where the icons comprise one or more assigned icons from an assigned icons list and candidate icons from a candidate icons list at step 804. Both the assigned and candidate icons are derived from a pool of icons. The method 800 also can include assigning an icon to a currently displayed screen utilizing a selection tool and placing the icon in the assigned icons list, where the icon is selected from the candidate icons list at step 806. Furthermore, the method 800 can include, at step 808, returning to the assigned screen when the assigned icon is selected. The method 800 illustratively concludes at step 810.

According to another embodiment, the method 800 can include, at the assigning step 806, assigning an icon to a log on or sign on process for a particular user of the system. The method 800 can also include identifying frequently visited screens with counters, wherein each screen has a counter which is incremented each time a user visits the particular screen and which can be reset by the user. Furthermore, the method 800 can further include notifying a user when a counter for a particular screen reaches a user-defined threshold.

In one embodiment, the method 800 can include modifying the functions of a particular icon when the icon is selected, wherein the functions are selected from at least one among returning a displayed icon to the pool of icons, replacing the displayed icon with a new icon, elevating or reducing the functionality of an icon, and including the icon in a defined sequence of functions. The method 800 can further include moving directly from one screen to an assigned screen when the corresponding assigned icon is selected. In another embodiment, the method 800 can include utilizing a super icon, wherein the super icon is used to select a new set of preferred icons to be displayed in the assigned icons list. The method can further include utilizing a next icon, wherein the next icon is selected by a user to step through sequential screens.

The invention, as already mentioned, can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is suitable. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention has been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

We claim:

1. A computer-based method, the method comprising:
   initiating, at a computer system associated with one of a plurality of users, a session for accessing a plurality of computer screens via a display device of the computer system, at least one of the plurality of computer screens being obscured at any one time during the session and at least one of the plurality of computer screens being presented at the display device at the one time during the session to yield a currently presented screen;
   during the session and concurrently with the currently presented screen, persistently displaying a plurality of icons on the display device without obscuring a content of the currently presented screen to yield displayed icons, the displayed icons selected from a pool of icons associated with the plurality of users and comprising a grouping of one or more assigned icons and a grouping of one or more candidate icons;
   configuring the display device to cause the currently presented screen to be a one of the plurality of computer screens not associated with any of the assigned icons to yield an unassigned computer screen, wherein the computer system prompts the selection of the candidate icons when the unassigned computer screen had been accessed a set threshold number of times, and wherein the prompting occurs by altering a visual display of the candidate icons;
   determining during display of the unassigned computer screen, that one of the candidate icons has been selected during the session to yield a selected icon, wherein the selected icon is selected to have a first functionality to a first user in the plurality of users and selected to have a second functionality particular to a second user in the plurality of users; and in response to determining that one of the candidate icons has been selected during display of the unassigned computer screen, transferring the selected icon from the grouping of candidate icons to the grouping of assigned icons, associating the selected icon with the unassigned computer screen to yield an assigned screen, and configuring the selected icon to cause the assigned screen to be the currently presented screen during the session and any other session associated with the plurality of users in response to selection of the selected icon.

2. The method of claim 1, wherein at least one icon in the pool of icons is selected to have functionality for one or more particular users from the plurality of users, and wherein at least one icon in the pool of icons is selected to have functionality for all of the plurality of users.

3. The method of claim 1, wherein at least one icon in the pool of icons is selected to have meaning for only a limited period of time.

4. The method of claim 1, further comprising modifying a functionality for a selected icon, the modifying comprising configuring the selected icon to change in appearance when a change occurs on the assigned screen.

5. The method of claim 4, wherein the change in appearance can be configured to have meaning for one or more particular users from the plurality of users.

6. A computer-based system for personalized navigation of computer screens, the system comprising:
   at least one electronic data processor; and
   a memory storing a computer program configured to execute on the at least one electronic data processor, wherein the computer program is configured to cause at least one electronic processor to:
   initiate, at a computer system associated with one of a plurality of users, a session for accessing a plurality of computer screens via a display device of the computer system, at least one of the plurality of computer screens being obscured at any one time during the session and at least one of the plurality of computer screens being presented at the display device at the one time during the session to yield a currently presented screen;
   during the session and concurrently with the currently presented screen, persistently displaying a plurality of icons on the display device without obscuring a content of the currently presented screen to yield displayed icons, the displayed icons selected from a pool of icons associated with the plurality of users and comprising a grouping of one or more assigned icons and a grouping of one or more candidate icons;
   configuring the display device to cause the currently presented screen to be a one of the plurality of computer screens not associated with any of the assigned icons to yield an unassigned computer screen, wherein the computer system prompts the selection of the candidate icons when the unassigned computer screen has been accessed a set threshold number of times, and wherein the prompting occurs by altering a visual display of the candidate icons;
   determining during display of the unassigned computer screen, that one of the candidate icons has been selected during the session to yield a selected icon, wherein the selected icon is selected to have a first functionality to a first user in the plurality of users and selected to have a second functionality particular to a second user in the plurality of users; and
   in response to determining that one of the candidate icons has been selected during display of the unassigned computer screen, transferring the selected icon from the grouping of candidate icons to the grouping of assigned icons, associating the selected icon with the unassigned computer screen to yield an assigned screen, and configuring the selected icon to cause the assigned screen to be the currently presented screen during the session and any other session associated with the plurality of users in response to selection of the selected icon.

7. The system of claim 6, wherein at least one icon in the pool of icons is selected to have meaning to one or more particular users from the plurality of users.

8. The system of claim 6, wherein at least one icon in the pool of icons is selected to have meaning for all of the plurality of users.

9. The system of claim 6, wherein at least one icon in the pool of icons is selected to have meaning for only a limited period of time.

10. The system of claim 6, wherein the computer program is further configured to cause at least one electronic processor to modify a functionality for a selected icon, the modifying comprising configuring the selected icon to change in appearance when a change occurs on the assigned screen.

11. The system of claim 10, wherein the change in appearance can be configured to have meaning for one or more particular users from the plurality of users.

12. A non-transitory computer-readable storage medium having stored therein computer-readable instructions, which, when loaded in and executed by a computer causes the computer to perform the steps of:

initiating, at a computer system associated with one of a plurality of users, a session for accessing a plurality of computer screens via a display device of the computer system, at least one of the plurality of computer screens being obscured at any one time during the session and at least one of the plurality of computer screens being presented at the display device at the one time during the session to yield a currently presented screen;

during the session and concurrently with the currently presented screen, persistently displaying a plurality of icons on the display device without obscuring a content of the currently presented screen to yield displayed icons, the displayed icons selected from a pool of icons associated with the plurality of users and comprising a grouping of one or more assigned icons and a grouping of one or more candidate icons;

configuring the display device to cause the currently presented screen to be a one of the plurality of computer screens not associated with any of the assigned icons to yield an unassigned computer screen, wherein the computer system prompts the selection of the candidate icons when the unassigned computer screen has been accessed a set threshold number of times, and wherein the prompting occurs by altering a visual display of the candidate icons;

determining during display of the unassigned computer screen, that one of the candidate icons has been selected during the session to yield a selected icon, wherein the selected icon is selected to have a first functionality to a first user in the plurality of users and selected to have a second functionality particular to a second user in the plurality of users; and in response to determining that one of the candidate icons has been selected during display of the unassigned computer screen, transferring the selected icon from the grouping of candidate icons to the grouping of assigned icons, associating the selected icon with the unassigned computer screen to yield an assigned screen, and configuring the selected icon to cause the assigned screen to be the currently presented screen during the session and any other session associated with the plurality of users in response to selection of the selected icon.

13. The non-transitory computer-readable storage medium of claim 12, wherein at least one icon in the pool of icons is selected to have meaning to one or more particular users from the plurality of users.

14. The non-transitory computer-readable storage medium of claim 12, wherein at least one icon in the pool of icons is selected to have meaning for all of the plurality of users.

15. The non-transitory computer-readable storage medium of claim 12, wherein at least one icon in the pool of icons is selected to have meaning for only a limited period of time.

16. The non-transitory computer-readable storage medium of claim 12, further comprising modifying a functionality for a selected icon, the modifying comprising configuring the selected icon to change in appearance when a change occurs on the assigned screen.

17. The method of claim 1, wherein the grouping of one or more assigned icons and the grouping of one or more candidate icons further comprises:

each one of the assigned icons associated with different ones of the plurality of computer screens and configured to cause an associated one of the plurality of computer screens to be the currently presented screen in response to selection of the one of the assigned icons and the one or more candidate icons configured to cause no change at the display device in response to selection of any of the candidate icons.

18. The system of claim 6, wherein the grouping of one or more assigned icons and the grouping of one or more candidate icons further comprises:

each one of the assigned icons associated with different ones of the plurality of computer screens and configured to cause an associated one of the plurality of computer screens to be the currently presented screen in response to selection of the one of the assigned icons and the one or more candidate icons configured to cause no change at the display device in response to selection of any of the candidate icons.

19. The non-transitory computer-readable storage medium of claim 12, wherein the grouping of one or more assigned icons and the grouping of one or more candidate icons further comprises:

each one of the assigned icons associated with different ones of the plurality of computer screens and configured to cause an associated one of the plurality of computer screens to be the currently presented screen in response to selection of the one of the assigned icons and the one or more candidate icons configured to cause no change at the display device in response to selection of any of the candidate icons.

20. The method of claim 1, wherein altering a visual display of the candidate icons includes at least one of providing a notification on the icon, providing an alert on the icon, providing a warning on the icon, configuring the icon to blink, configuring the icon to change color.

* * * * *